(12) United States Patent
Dingle et al.

(10) Patent No.: US 9,371,184 B1
(45) Date of Patent: Jun. 21, 2016

(54) MOBILE DRIVE UNIT CHARGING

(71) Applicant: Amazon Technologies, Inc., Reno, NV (US)

(72) Inventors: Patrick Ryan Dingle, Acton, MA (US); Matthew David Verminski, North Andover, MA (US); Peter K. Mansfield, Bellevue, WA (US); Andrew Stubbs, Waltham, MA (US); Sean Hugh Breheny, Watertown, MA (US); Peter R. Wurman, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 14/036,290

(22) Filed: Sep. 25, 2013

(51) Int. Cl.
*G06F 7/00* (2006.01)
*B65G 1/137* (2006.01)

(52) U.S. Cl.
CPC .................................. *B65G 1/1373* (2013.01)

(58) Field of Classification Search
None
See application file for complete search history.

(56) References Cited

U.S. PATENT DOCUMENTS

| 2007/0294029 | A1* | 12/2007 | D'Andrea | G01C 21/005 701/410 |
| 2010/0138095 | A1* | 6/2010 | Redmann, Jr. | B60L 11/1861 701/24 |
| 2011/0106294 | A1* | 5/2011 | Bebbington | 700/215 |
| 2011/0279244 | A1* | 11/2011 | Park et al. | 340/10.34 |
| 2013/0249219 | A1* | 9/2013 | Kim et al. | 290/36 R |

* cited by examiner

*Primary Examiner* — Yolanda Cumbess
(74) *Attorney, Agent, or Firm* — Lee & Hayes, PLLC

(57) ABSTRACT

Some examples include charging an onboard power source of a mobile drive unit (MDU) of an inventory system while the MDU is operating in the inventory system, rather than removing the MDU from service for recharging. As an example, the MDU may receive instructions to retrieve an inventory holder, and an onboard power source of the MDU may be charged while the MDU and the inventory holder are located at the charging station.

20 Claims, 8 Drawing Sheets

MOBILE DRIVE UNIT CHARGING

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.).

Inventory systems that utilize robots for managing inventory may periodically remove the robots from service in order to recharge the robots. As such, additional robots may be required in order to compensate for the removal of some robots from service for recharging. Further, recharging stations may utilize valuable floor space that may otherwise be used, for example, to store inventory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
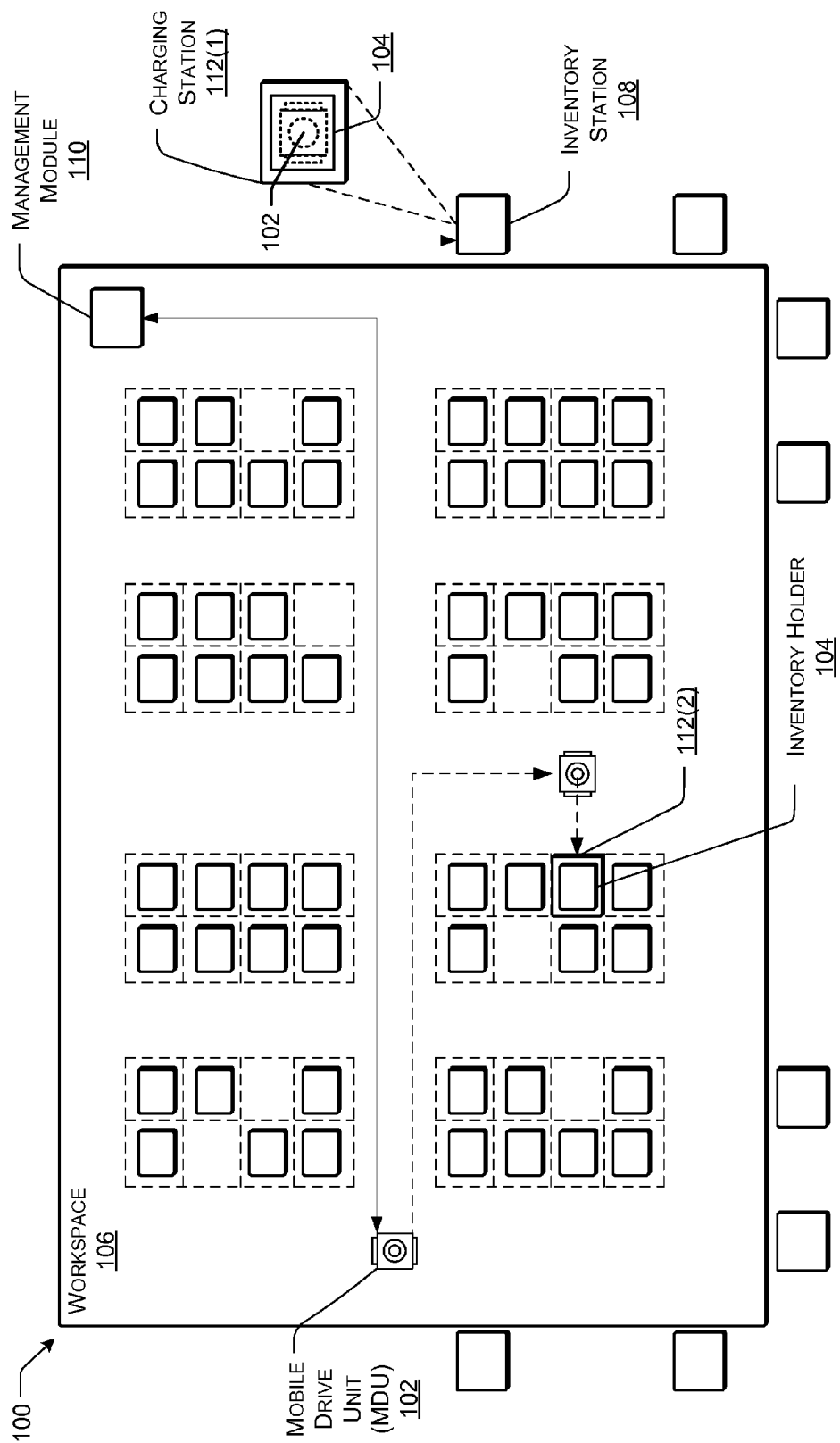
FIG. 1 illustrates an example inventory system in which a mobile drive unit of an inventory system may be charged while operating, according to some implementations.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems of the present disclosure utilize one or more mobile drive units to automatically retrieve inventory holders from warehouse storage. The inventory holders may be entire racks of shelves, with each shelf having bins for various inventory items. Mobile drive units ("MDUs") may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. The ability for mobile drive units to transport inventory items to a station for performing inventory operations rather than or in addition to workers manually retrieving inventory items from stationary racks may vastly increase efficiency and productivity of the inventory system. For example, by utilizing mobile drive units, an inventory system may be capable of fulfilling more orders per hour than previous solutions. Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

This disclosure includes, in part, techniques and arrangements for charging a mobile drive unit while the mobile drive unit is operating in the inventory system. In some implementations, one or more mobile drive unit charging stations at one or more inventory stations of the inventory system may allow the mobile drive unit to charge while the mobile drive unit is docked with an inventory holder at or adjacent to an inventory station. In some implementations, one or more mobile drive unit charging stations within a storage area of the inventory system may allow the mobile drive unit to charge while performing a task (e.g., while presenting an inventory holder to an operator or while docking with or otherwise retrieving an inventory holder from storage) in the inventory system.

In some examples, the techniques described herein may reduce overall system cost by charging the mobile drive units while operating rather than removing the mobile drive units from service for recharging. As an illustrative example, over a particular operating time period, some mobile drive units may be recharged at an average rate of five minutes every hour. In this example, approximately eight percent of all mobile drive units would be removed from service for recharging at any given time. In order to compensate for the removal of some of the mobile drive units, the inventory system may rely on additional costly mobile drive units.

The techniques described herein may reduce the number of mobile drive units in an inventory system by reducing or eliminating the down-time associated with removing select mobile drive units from service for recharging. Further, valuable floor space normally reserved for charging stations may be freed up for alternative uses.

This and other examples of operating an inventory system are described below. The techniques discussed herein may be implemented in many different ways, by many different systems. Various representative implementations are provided below with reference to the figures.

FIG. 1 shows one illustrative example of an inventory system 100 according to some implementations. The inventory system 100 may be arranged in a facility or warehouse (e.g., distribution facility, fulfillment center, etc.) that is logically organized into areas or regions associated with various functions. In FIG. 1, a mobile drive unit 102 may dock with an inventory holder 104 and move the inventory holder 104 between locations within a workspace 106 (e.g., a storage area of a warehouse). In some implementations, a management module 110 may communicate with the mobile drive unit 102 to direct the mobile drive unit 102 to retrieve a particular inventory holder 104 from a particular location in the workspace 106. In the present disclosure, one or more charging stations 112 within the inventory system 100 may allow an onboard power source (not shown in FIG. 1) of the mobile drive unit 102 to be recharged while the mobile drive unit 102 continues to "operate" within the inventory system 100. To illustrate, in some implementations, the mobile drive unit 102 may retrieve the inventory holder 104 by docking with the inventory holder 104 and transporting the inventory holder 104 to an inventory station 108 that may include a charging station 112(1), in order to allow the mobile drive unit 102 to be recharged at or adjacent to the inventory station 108. An operator at the inventory station 108 may pick one or more inventory items from the inventory holder 104 or perform other inventory operations while the mobile drive unit 102 is docked with the inventory holder 104 at or adjacent to the inventory station 108. That is, in this case, the mobile drive unit 102 may continue to "operate" within the inventory system 100 at or adjacent to the inventory station 108, rather than being removed from service for recharging at a separate charging location. Alternatively or additionally, in some implementations, while retrieving the particular inventory holder 104 or otherwise operating at the storage location, the mobile drive unit 102 may utilize a charging station 112(2) at the storage location to at least partially recharge an onboard power source. Thus, FIG. 1 illustrates an example inventory system 100 that may allow mobile drive units 102 to charge while operating (e.g., while loaded with inventory holders 104 at inventory stations 108 or while retrieving inventory holders 104 from storage locations), rather than being removed from service for recharging.

The mobile drive units 102 may represent any devices or components appropriate for use in the inventory system 100 based on the characteristics and configuration of the inventory holders 104 and/or other elements of the inventory system 100. In some implementations of the inventory system 100, the mobile drive units 102 may represent independent, self-powered devices configured to freely move about the workspace 106, under their own direction or through coordination by the management module 110. Alternatively, the mobile drive units 102 may represent elements of a tracked inventory system 100 configured to move an inventory holder 104 along tracks, rails, or other guidance or support elements. It will be appreciated that the mobile drive units 102 may be configured to utilize alternative conveyance equipment to move within the workspace 106 and/or between separate portions of the workspace 106.

In some embodiments, the inventory system 100 may include two or more different types of mobile drive units 102 having various capabilities and specifications. Moreover, although illustrated and discussed as though mobile drive units 102 are a particular type of mobile drive unit, mobile drive units 102 may refer to various types of mobile drive units. For example, one type of mobile drive unit 102 may be operable to transport relatively large, heavy, or bulky inventory items. Another type of mobile drive unit 102 may be operable to transport relatively lighter and/or more compact inventory items. Mobile drive units 102 may accordingly have various power trains, load capacities, and other appropriate specifications to transport particular inventory items in various types of the inventory holders 104 within the inventory system 100.

The mobile drive units 102 may be capable of communicating with the management module 110 to receive information identifying selected inventory holders 104, transmit the locations of mobile drive units 102, or exchange any other suitable information to be used by the management module 110 or mobile drive units 102 during operation. The mobile drive units 102 may communicate with the management module 110 wirelessly, using wired connections between mobile drive units 102 and management module 110, and/or in any other appropriate manner. As one example, the mobile drive unit 102 may communicate with the management module 110 and/or with another mobile drive unit 102 using 802.11, Bluetooth, or Infrared Data Association (IrDA) standards, or any other appropriate wireless communication protocol. As another example, in a tracked inventory system 100, tracks or other guidance elements upon which the mobile drive units 102 move may be wired to facilitate communication between the mobile drive units 102 and other components of the inventory system 100. In general, mobile drive units 102 may be propelled and controlled in any manner appropriate based on the configuration and characteristics of the inventory system 100.

Each inventory holder 104 may be implemented as a physical structure to hold various inventory items. In FIG. 1, only some of the inventory holders 104 are shown referenced with the number 104 for ease of illustration. The inventory holder 104 has a physical length, width, and height that may be standardized or varied within the inventory system 100. As used herein, the inventory holders 104 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on.

Figure 5:
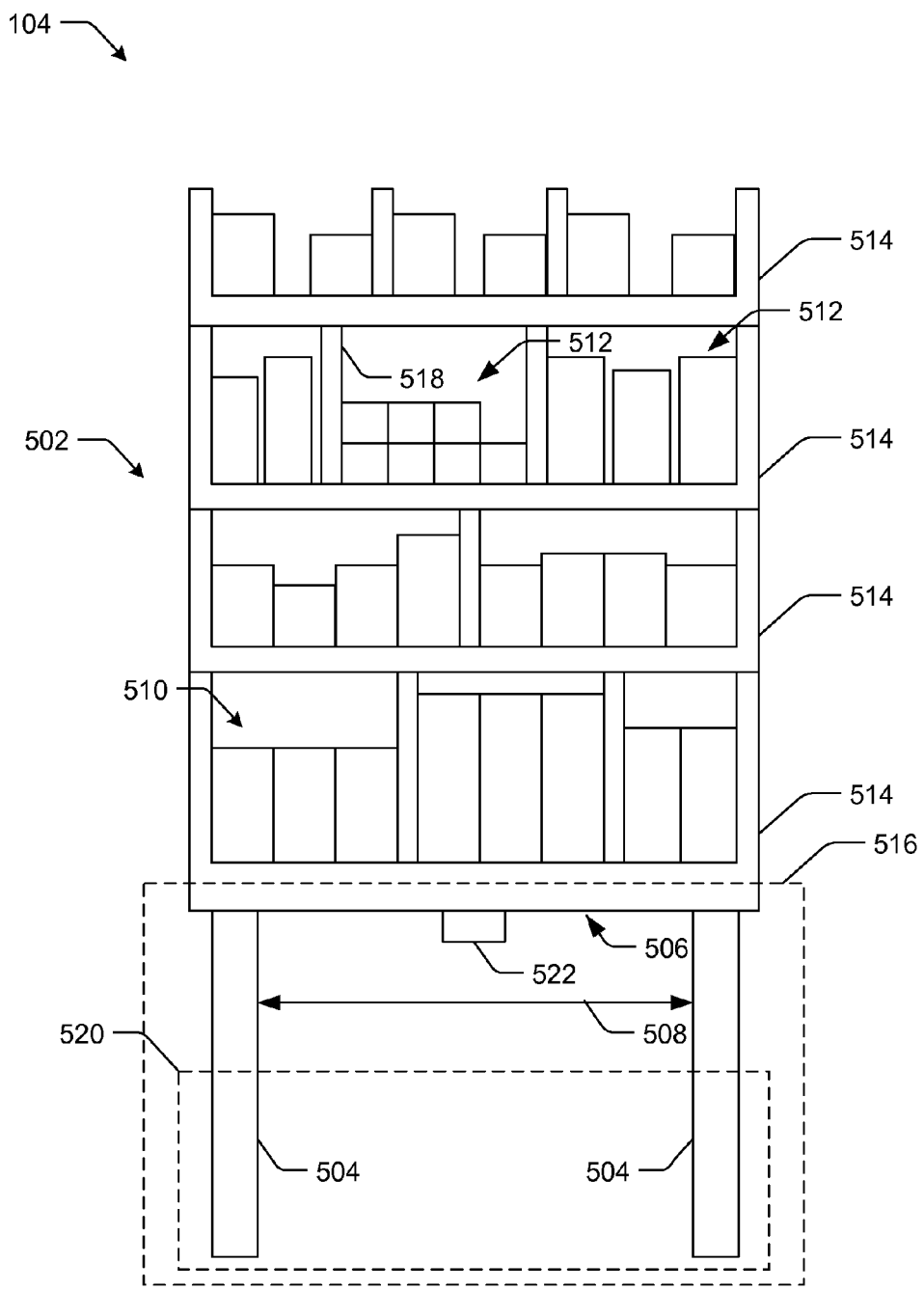
FIG. 5 illustrates components of an example inventory holder for use in an inventory system, according to some implementations.

In one implementation, the inventory holder 104 may be formed as a rack having multiple shelves to support various types of inventory items. For instance, the inventory holders 104 may include multiple storage bins with each storage bin capable of holding a different type of inventory item. The inventory holders 104 are capable of being carried, rolled, or otherwise moved by the mobile drive units 102. Each inventory holder 104 may have a plurality of faces, and each bin may be accessible through specific faces. The rack is freestanding when at rest, but can be lifted and moved by the mobile drive units 102. The mobile drive units 102 may be configured to rotate inventory holders 104 at appropriate times to present particular faces of inventory holders 104 and the associated bins to an operator or other components of inventory system 100. One example is described below in more detail with reference to FIG. 5. While FIG. 5 illustrates one illustrative example of an inventory holder 104, it will be appreciated that alternative inventory holder designs may also be used. For example, an inventory holder 104 may have no shelves and be a "single container" (e.g., a bin or a tote that stores inventory items) that may be transported by the mobile drive unit 102. As another example, an inventory item may itself serve as its own "inventory holder." For example, if a car is lifted and moved by a large mobile drive unit 102, the mobile drive unit 102 may be able to attach to the wheels of the car in order to lift the car. Further, it will be appreciated that some mobile drive units may be capable of retrieving inventory items directly from shelves rather than moving the whole shelves.

The mobile drive units 102 may retrieve inventory holders 104 and transport the inventory holders 104 between any number of predefined physical locations. For illustration purposes, rectangular areas are depicted in FIG. 1 to designate physical locations within the facility that may be used to place an associated inventory holder. Each location may accommodate an inventory holder 104. That is, each inventory holder 104 may stand at rest within the area of the floor reserved or otherwise predefined as a storage location. An inventory holder 104 may be placed within a corresponding storage location until needed at one or more inventory stations 108.

Inventory stations 108 represent locations designated for the completion of particular tasks involving inventory items. Such tasks may include the removal of inventory items from inventory holders 104, the introduction of inventory items into inventory holders 104, the counting of inventory items in inventory holders 104, the decomposition of inventory items (e.g., from pallet-sized or case-sized groups to individual inventory items), and/or the processing or handling of inventory items in any other suitable manner. In some implementations, the inventory stations 108 may represent the physical locations where a particular task involving inventory items can be completed within the workspace 106. In alternative implementations, the inventory stations 108 may represent both the physical location and also any appropriate equipment for processing or handling inventory items, such as scanners for monitoring the flow of inventory items in and out of the inventory system 100, communication interfaces for communicating with the management module 110, and/or any other suitable components. Inventory stations 108 may be controlled, entirely or in part, by human operators or may be fully automated. Moreover, the human or automated operators of inventory stations 108 may be capable of performing certain tasks to inventory items, such as packing or counting inventory items, as part of the operation of the inventory system 100.

In some implementations, the management module 110 orchestrates movement of the mobile drive units 102, directing them to various regions within the warehouse. The management module 110 coordinates transport of the various inventory holders 104 among the regions in the warehouse. In some implementations, charging stations 112 may be associated with various locations in the warehouse. While FIG. 1 illustrates a single charging station 112(1) at one inventory station 108 and a single charging station 112(2) associated with one storage location in the workspace 106, it will be appreciated that the inventory system 100 may include multiple charging stations 112 at other locations within the workspace 106 or at one or more additional inventory stations 108. As an illustrative example, in some implementations, each inventory station 108 may include its own charging station 112.

In some implementations, the management module 110 may select a particular MDU 102 to perform a particular task based at least in part on a charge level of an onboard power source of the MDU 102. For example, the management module 110 may determine that a particular task to be performed at the inventory station 108 may include an operator picking multiple items from the inventory holder 104. The management module 110 may determine a time period (e.g., an average "dwell time") that an MDU 102 is expected to be docked with the inventory holder 104 and located at the inventory station 108 in order for the operator to perform the picking task. Accordingly, in this example, the management module 110 may select a particular MDU 102 to perform the task in order to recharge the MDU 102 at the charging station 112(1) located at the inventory station 108 based at least in part on the charge level of the onboard power source of the particular MDU 102 and the expected dwell time associated with the task. It will be appreciated that the management module 110 may select an MDU 102 with a higher charge level to perform a task involving a shorter dwell time, while the management module 110 may select a different MDU 102 with a lower charge level to perform a task involving a longer dwell time. In some implementations, the management module 110 may use multiple factors to select the particular MDU 102 to retrieve the inventory holder 104, such as a charge level of the onboard power source, a time period associated with performing a particular task, a location of an MDU 102 with respect to the inventory holder 104, a location of an MDU 102 with respect to an inventory station 108, a location of the inventory holder 104 with respect to an inventory station 108 or a relative speed of the operator at the inventory station 108, among other alternatives. Further, the management module 110 may direct a particular MDU 102 to another location in the workspace 106 (or to another inventory station 108) that includes a charging station 112 and that is not currently being used, in order to recharge the MDU 102.

Thus, the charging stations 112 of the present disclosure may not represent vacant stations dedicated to recharging that occupy valuable warehouse space. Rather, the charging stations 112 may allow the MDU 102 to be recharged while "operating" (e.g., when the MDU 102 is docked with the inventory holder 104 at or adjacent to an inventory station 108 or at a storage location) as well as "not operating" (e.g., when the inventory holder 104 is not loaded onto the MDU 102). It will be appreciated that the term "operating" as used herein does not necessarily indicate that all components of the MDU 102 remain active. Rather, select components of the MDU 102 that are not currently being used may be powered down or otherwise deactivated during operation. To illustrate, one or more components of the MDU 102 may be powered down or otherwise deactivated while the MDU 102 is docked with the inventory holder 104 at the inventory station 108. In this illustrative example, the MDU 102 may still be considered to be "operating" at the inventory station 108, as the MDU 102 has executed a retrieval operation involving the transportation of one or more inventory items to the inventory station 108 via the inventory holder 104. The MDU 102 may remain at the inventory station 108 until the operator completes one or more tasks such as picking items from the inventory holder 104 or replenishing items on the inventory holder 104.

In some implementations, the mobile drive unit 102 may use a dwell time associated with the MDU 102 operating at a particular location to receive a "quick burst" of charge that may allow for the MDU 102 to increase its state of charge while waiting for the transaction to be completed. As an illustrative example, the dwell time associated with the MDU 102 retrieving the inventory holder 104 may average about twelve to fifteen seconds. Thus, on average, the MDU 102 may be able to recharge for an average of twelve to fifteen seconds while operating at a particular location. As another example, the dwell time associated with a picking operation at the inventory station 108 may vary based on a number of inventory items to be retrieved from the inventory holder 104 while the MDU 102 is docked with the inventory holder 104 at the inventory station 108.

In some implementations, the average dwell time at a particular location may not provide an adequate recharge time period for particular types of batteries. That is, some batteries may not be able to absorb a large amount of current quickly (e.g., hundreds of amps over a short dwell time). As such, in some implementations, the MDU 102 may include a capacitor (e.g., an ultracapacitor or a supercapacitor) or other "fast charging" device (e.g., particular types of lithium-ion batteries).

In some implementations, the MDU 102 may connect with a ground contact in or on a floor of the warehouse. In this case, there may be an electromechanical linkage between the mobile drive unit 102 and the charging station 112 (see e.g., FIG. 2). It will be appreciated that alternative arrangements of one or more contacts (e.g., electrical contacts on one or more sides of the MDU 102) may be used for electrical connection with the charging station 112. Alternatively, a contactless charging system (e.g., an inductive charging system or other wireless charging system, such as a laser) may be used to connect the MDU 102 and the charging station 112.

The illustrative workspace 106 of FIG. 1 represents an area associated with the inventory system 100 in which mobile drive units 102 can move and/or inventory holders 104 can be stored. For example, the workspace 106 may represent all or part of the floor of a mail-order warehouse in which the inventory system 100 operates. Although FIG. 1 shows, for the purposes of illustration, an embodiment of the inventory system 100 in which the workspace 106 includes a fixed, predetermined, and finite physical space, some implementations of the inventory system 100 may include mobile drive units 102 and inventory holders 104 that are configured to operate within a workspace 106 that is of variable dimensions and/or an arbitrary geometry. Further, while FIG. 1 illustrates an example inventory system 100 in which the workspace 106 is entirely enclosed in a building, alternative embodiments may utilize workspaces 106 in which some or all of the workspace 106 is located outdoors, on multiple floors or levels, within a vehicle (such as a cargo ship), or otherwise unconstrained by any fixed structure.

In some examples, the management module 110 may generate task assignments based, in part, on inventory requests that the management module 110 receives from other components of the inventory system 100 and/or from external components in communication with the management module 110. These inventory requests may identify particular operations to be completed involving inventory items stored or to be stored within the inventory system 100 and may represent communication of any suitable form. For example, in some implementations, an inventory request may represent a shipping order specifying particular inventory items that have been purchased by a customer and that are to be retrieved from the inventory system 100 for shipment to the customer. The management module 110 may also generate task assignments independently of such inventory requests, as part of the overall management and maintenance of the inventory system 100. For example, the management module 110 may generate task assignments in response to the occurrence of a particular event (e.g., in response to a mobile drive unit 102 requesting a space to park), according to a predetermined schedule (e.g., as part of a daily start-up routine), or at any appropriate time based on the configuration and characteristics of the inventory system 100. After generating one or more task assignments, the management module 110 may transmit the generated task assignments to appropriate components for completion of the corresponding task. The relevant components may then execute their assigned tasks.

As part of completing these tasks, mobile drive units 102 may dock with and transport inventory holders 104 within the workspace 106. Mobile drive units 102 may dock with inventory holders 104 by connecting to, lifting, and/or otherwise interacting with inventory holders 104 in any other suitable manner so that, when docked, mobile drive units 102 are coupled to and/or support inventory holders 104 and can move inventory holders 104 within the workspace 106 and to the inventory stations 108. While the description below describes examples of a mobile drive unit 102 and inventory holder 104 that are configured to dock in a particular manner, alternative embodiments of mobile drive unit 102 and inventory holder 104 may be configured to dock in any manner suitable to allow mobile drive unit 102 to move inventory holder 104 within the workspace 106 and to the inventory stations 108.

Thus, FIG. 1 illustrates an example inventory system 100 in which the mobile drive unit 102 may utilize the charging station 112 to at least partially recharge an onboard power source while "operating" at a particular location (e.g., while docked with the inventory holder 104 at or adjacent to an inventory station 108 or while retrieving the inventory holder 104 from a particular location in the workspace 106). Allowing mobile drive units 102 to charge while operating, rather than being removed from service for recharging at a dedicated recharging station, may reduce overall system costs associated with additional MDUs 102 and may free up valuable floor space.

Figure 2:
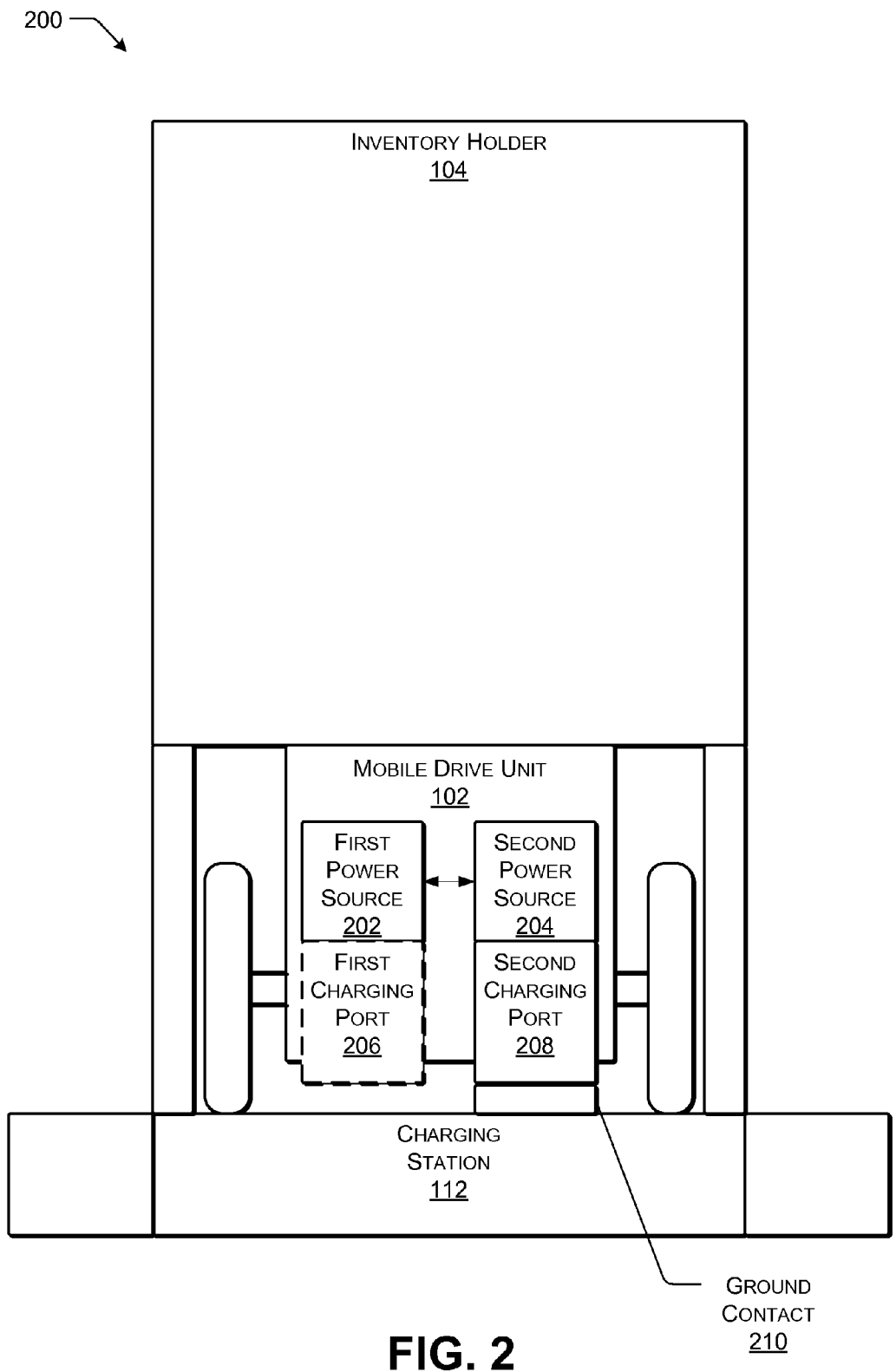
FIG. 2 illustrates an example framework for charging a mobile drive unit of an inventory system while operating the mobile drive unit, according to some implementations.

FIG. 2 illustrates an example framework 200 for charging the mobile drive unit 102 while operating the mobile drive unit 102 in the inventory system 100 according to some implementations.

In FIG. 2, the mobile drive unit 102 is docked with an inventory holder 104. That is, the inventory holder 104 is loaded onto the mobile drive unit 102, and the mobile drive unit 102 may transport the inventory holder 104 between various locations in the warehouse. For example, the mobile drive unit 102 may be directed to the particular inventory holder 104 by the management module 110 of FIG. 1 in order to retrieve the inventory holder 104 that includes one or more inventory items and to transport the retrieved inventory holder 104 to an inventory station 108. The mobile drive unit 102 may utilize one or more charging stations 112(1), 112(2) to at least partially recharge at least one onboard power source while the mobile drive unit 102 is operating in the inventory system 100.

In the example illustrated in FIG. 2, the mobile drive unit 102 includes a first power source 202 and a second power source 204. In some implementations, the first power source 202 may include a "slow charging device" (e.g., a battery), while the second power source 204 may include a "fast charging device" (e.g., a capacitor). In some implementations, a first charging interface 206 (e.g., a first docking port) is associated with the first power source 202, and a second charging interface 208 (e.g., a second docking port) is associated with the second power source 204. However, in alternative implementations, it will be appreciated that the MDU 102 may include a single charging interface. In the example of FIG. 2, the MDU 102 may connect with a contact in a floor via a ground contact 210. Alternatively, a contactless charging system (e.g., an inductive charging system or other wireless charging system) may be used to connect the MDU 102 and the MDU charging station 112. In some implementations, the second power source 204 (e.g., the capacitor) may be used to recharge the first power source 202.

In some examples, the ground contact 210 may include one or more strips in the floor that the MDU 102 drives over and makes contact with. Alternatively, there may be active engagement of the second charging interface 208 with the ground contact 210.

Figure 3:
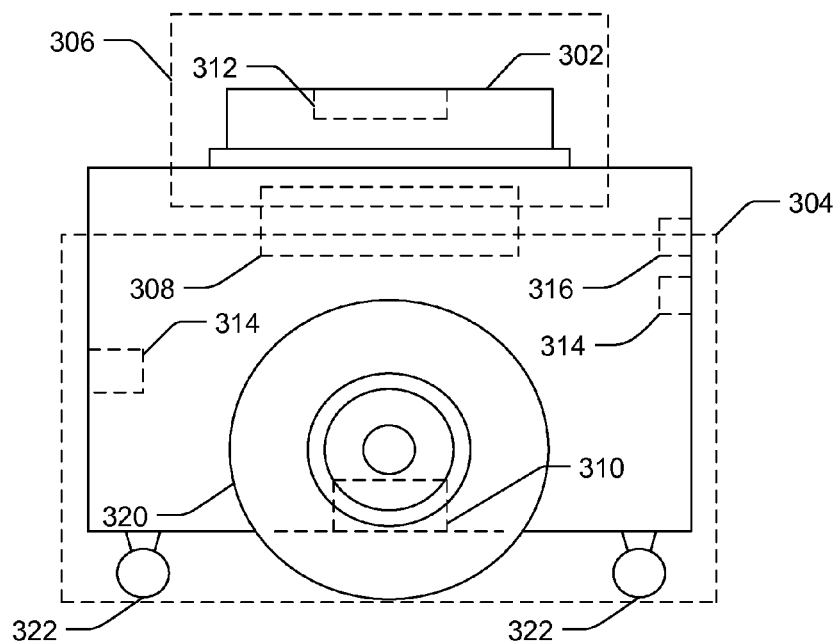
FIGS. 3 and 4 illustrate components of an example mobile drive unit configured to charge while operating in an inventory system, according to some implementations.
Figure 4:
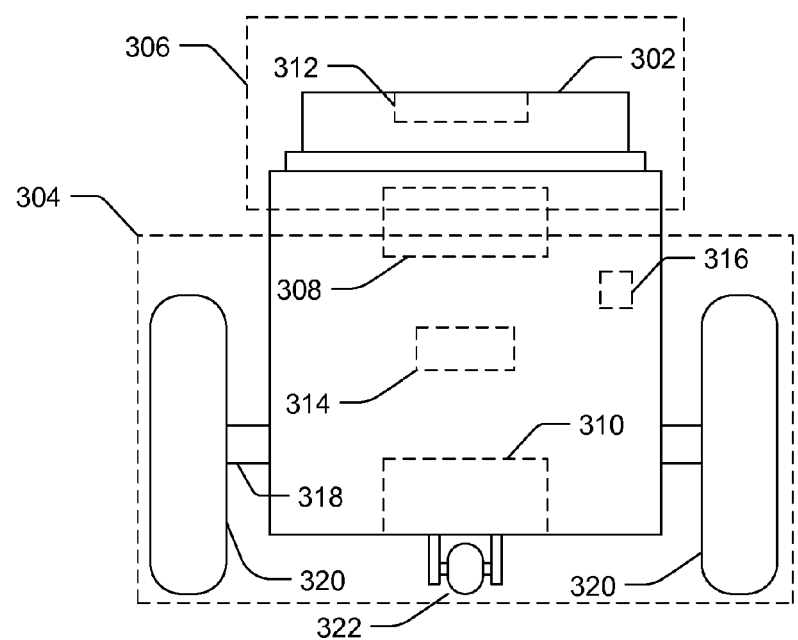

FIGS. 3 and 4 illustrate in greater detail the components of the mobile drive unit 102, according to some implementations. In particular, FIGS. 3 and 4 include a front and side view of an example mobile drive unit 102. The mobile drive unit 102 may include an end effector 302 (e.g., a docking head), a drive module 304, a docking actuator 306, and a control module 308. As used herein, the term "end effector" may include one or more components or mechanisms on the mobile drive unit 102 that are designed to dock with, lift, or otherwise assume control of the inventory holder 104 or the inventory itself. Additionally, the mobile drive unit 102 may include one or more sensors configured to detect or determine the location of the mobile drive unit 102, the inventory holder 104, and/or other appropriate elements of the inventory system 100. In the illustrated example, the mobile drive unit 102 includes a position sensor 310, a holder sensor 312, an obstacle sensor 314, and an identification signal transmitter 316.

The end effector 302, in some examples of mobile drive unit 102, couples the mobile drive unit 102 to the inventory holder 104 and/or supports the inventory holder 104 when the mobile drive unit 102 is docked to the inventory holder 104. The end effector 302 may additionally allow the mobile drive unit 102 to maneuver the inventory holder 104, such as by lifting the inventory holder 104, propelling the inventory holder 104, rotating the inventory holder 104, and/or moving the inventory holder 104 in any other appropriate manner. The end effector 302 may also include any appropriate combination of components, such as ribs, spikes, and/or corrugations, to facilitate such manipulation of the inventory holder 104. For example, in some implementations, the end effector 302 may include a high-friction portion that abuts a portion of the inventory holder 104 while the mobile drive unit 102 is docked to the inventory holder 104. In such embodiments, frictional forces created between the high-friction portion of the end effector 302 and a surface of the inventory holder 104 may induce translational and rotational movement in the inventory holder 104 when the end effector 302 moves and rotates, respectively. As a result, the mobile drive unit 102 may be able to manipulate the inventory holder 104 by moving or rotating the end effector 302, either independently or as a part of the movement of the mobile drive unit 102 as a whole.

The drive module 304 propels the mobile drive unit 102 and, when the mobile drive unit 102 and the inventory holder 104 are docked, may propel the inventory holder 104. The drive module 304 may represent any appropriate collection of components operable to propel the drive module 304. For example, in the illustrated example, the drive module 304 includes a motorized axle 318 (see FIG. 4), a pair of motorized wheels 320, and a pair of stabilizing wheels 322. One motorized wheel 320 is located at each end of motorized axle 318, and one stabilizing wheel 322 is positioned at each end of mobile drive unit 102.

The docking actuator 306 may move the end effector 302 towards the inventory holder 104 to facilitate docking of the mobile drive unit 102 and the inventory holder 104. The docking actuator 306 may also be capable of adjusting the position or orientation of the end effector 302 in other suitable manners to facilitate docking. The docking actuator 306 may include any appropriate components, based on the configuration of the mobile drive unit 102 and the inventory holder 104, for moving the end effector 302 or otherwise adjusting the position or orientation of the end effector 302. For example, in the illustrated example, the docking actuator 306 includes a motorized shaft (not shown) attached to the center of the end effector 302. The motorized shaft may be operable to lift the end effector 302 as appropriate for docking with the inventory holder 104.

The drive module 304 may be configured to propel the mobile drive unit 102 in any appropriate manner. For example, in the illustrated example, the motorized wheels 320 are operable to rotate in a first direction to propel the mobile drive unit 102 in a forward direction. The motorized wheels 320 are also operable to rotate in a second direction to propel the mobile drive unit 102 in a backward direction. In the illustrated example, the drive module 304 is also configured to rotate the mobile drive unit 102 by rotating the motorized wheels 320 in different directions from one another or by rotating the motorized wheels 320 at different speeds.

The position sensor 310 may include one or more sensors, detectors, or other components suitable for determining the location of the mobile drive unit 102 in any appropriate manner. For example, in some implementations, the workspace 106 associated with the inventory system 100 may include a number of fiducial marks that mark points on a two-dimensional grid that covers all or a portion of the workspace 106. In such cases, the position sensor 310 may include a camera and suitable image-processing and/or video-processing components, such as an appropriately-programmed digital signal processor, to allow the position sensor 310 to detect fiducial marks within the camera's field of view. The control module 308 may store location information that the position sensor 310 updates as the position sensor 310 detects fiducial marks. As a result, the position sensor 310 may utilize fiducial marks to maintain an accurate indication of the location of the mobile drive unit 102 and to aid in navigation when moving within the workspace 106.

The holder sensor 312 may represent one or more sensors, detectors, or other components suitable for detecting the inventory holder 104 and/or determining, in any appropriate manner, the location of the inventory holder 104, as an absolute location or as a position relative to the mobile drive unit 102. The holder sensor 312 may be capable of detecting the location of a particular portion of the inventory holder 104 or the inventory holder 104 as a whole. The mobile drive unit 102 may then use the detected information for docking with or otherwise interacting with the inventory holder 104.

In the illustrative example of FIGS. 3 and 4, the mobile drive unit 102 includes an optional obstacle sensor. The obstacle sensor 314 may represent one or more sensors capable of detecting objects located in one or more different directions in which the mobile drive unit 102 is capable of moving. The obstacle sensor 314 may utilize any appropriate components and techniques, including optical, radar, sonar, pressure-sensing and/or other types of detection devices appropriate to detect objects located in the direction of travel of the mobile drive unit 102. In some implementations, the obstacle sensor 314 may transmit information describing detected objects to the control module 308 to be used by the control module 308 to identify obstacles and to take appropriate remedial actions to prevent the mobile drive unit 102 from colliding with obstacles and/or other objects.

The obstacle sensor 314 may also detect signals transmitted by other mobile drive units 102 operating in the vicinity of the illustrated mobile drive unit 102. For example, in particular implementations of the inventory system 100, one or more mobile drive units 102 may include an identification signal transmitter 316 that transmits a drive identification signal. The drive identification signal may indicate to other mobile drive units 102 that the object transmitting the drive identification signal is in fact a mobile drive unit. The identification signal transmitter 316 may be capable of transmitting infrared, ultraviolet, audio, visible light, radio, and/or other suitable signals that indicate to recipients that the transmitting device is a mobile drive unit 102.

Additionally, in some implementations, the obstacle sensor 314 may also be capable of detecting state information transmitted by other mobile drive units 102. For example, the identification signal transmitter 316 may be capable of including state information relating to the mobile drive unit 102 in the transmitted identification signal. This state information may include, but is not limited to, the position, velocity, direction, and the braking capabilities of the transmitting mobile drive unit 102. In some implementations, the mobile drive unit 102 may use the state information transmitted by other mobile drive units to avoid collisions when operating in close proximity with those other mobile drive units.

The control module 308 may monitor and/or control operation of the drive module 304 and the docking actuator 306. The control module 308 may also receive information from sensors such as the position sensor 310 and the holder sensor 312 and adjust the operation of the drive module 304, the docking actuator 306, and/or other components of the mobile drive unit 102 based on this information. Additionally, in some implementations, the mobile drive unit 102 may be configured to communicate with a management device of the inventory system 100, and the control module 308 may receive commands transmitted to the mobile drive unit 102 and communicate information back to the management device utilizing appropriate communication components of the mobile drive unit 102. The control module 308 may include any appropriate hardware and/or software suitable to provide the described functionality. In some implementations, the control module 308 may include a general-purpose microprocessor programmed to provide the described functionality. Additionally, the control module 308 may include all or portions of the docking actuator 306, the drive module 304, the position sensor 310, and/or the holder sensor 312, and/or share components with any of these elements of the mobile drive unit 102.

Moreover, in some implementations, the control module 308 may include hardware and software located in components that are physically distinct from the device that houses the drive module 304, the docking actuator 306, and/or the other components of the mobile drive unit 102 described above. For example, in some implementations, each mobile drive unit 102 operating in the inventory system 100 may be associated with a software process (referred to here as a "drive agent") operating on a server that is in communication with the device that houses the drive module 304, the docking actuator 306, and other appropriate components of the mobile drive unit 102. This drive agent may be responsible for requesting and receiving tasks, requesting and receiving routes, transmitting state information associated with the mobile drive unit 102, and/or otherwise interacting with the management module 110 and other components of the inventory system 100 on behalf of the device that physically houses the drive module 304, the docking actuator 306, and the other appropriate components of the mobile drive unit 102. As a result, the term "mobile drive unit" includes software and/or hardware, such as agent processes, that provides the described functionality on behalf of the mobile drive unit 102 but that may be located in physically distinct devices from the drive module 304, the docking actuator 306, and/or the other components of the mobile drive unit 102 described above.

While FIGS. 3 and 4 illustrate a particular example of the mobile drive unit 102 containing certain components and configured to operate in a particular manner, it will be appreciated that the mobile drive unit 102 may represent any appropriate component and/or collection of components configured to transport and/or facilitate the transport of inventory holders 104.

FIG. 5 illustrates in greater detail the components of a particular example of the inventory holder 104. In particular, FIG. 5 illustrates the structure and contents of one side of an example inventory holder 104. In some implementations, the inventory holder 104 may comprise any number of faces with similar or different structure. As illustrated, the inventory holder 104 includes a frame 502, a plurality of legs 504, and a docking surface 506.

The frame 502 holds inventory items 510 and provides storage space for storing inventory items 510 external or internal to the frame 502. The storage space provided by the frame 502 may be divided into a plurality of inventory bins 512, each capable of holding inventory items 510. The inventory bins 512 may include any appropriate storage elements, such as bins, compartments, or hooks.

In some implementations, the frame 502 includes a plurality of trays 514 stacked upon one another and attached to or stacked on a base 516. In such cases, the inventory bins 512 may be formed by a plurality of adjustable dividers 518 that may be moved to resize one or more inventory bins 512. Alternatively, the frame 502 may represent a single inventory bin 512 that includes a single tray 514 and no adjustable dividers 518. Additionally, in some examples, the frame 502 may represent a load-bearing surface mounted on a mobility element 520. The inventory items 510 may be stored on such an inventory holder 104 by being placed on the frame 502. In general, the frame 502 may include storage internal and/or external storage space divided into any appropriate number of inventory bins 512 in any appropriate manner.

Additionally, in some implementations, the frame 502 may include a plurality of device openings 508 that allow the mobile drive unit 102 to position the end effector 302 adjacent to the docking surface 506. The size, shape, and placement of the device openings 508 may be determined based on the size, the shape, and other characteristics of the particular mobile drive unit 102 and/or inventory holder 104 utilized by the inventory system 100. For example, in the illustrated example, the frame 502 includes four legs 504 that form device openings 508 and allow the mobile drive unit 102 to be positioned under the frame 502 and adjacent to the docking surface 506. The length of the legs 504 may be determined based on a height of the mobile drive unit 102.

The docking surface 506 comprises a portion of the inventory holder 104 that couples to, abuts, and/or rests upon a portion of the end effector 302, when the mobile drive unit 102 is docked to the inventory holder 104. Additionally, the docking surface 506 supports a portion or all of the weight of the inventory holder 104 while the inventory holder 104 is docked with the mobile drive unit 102. The composition, shape, and/or texture of the docking surface 506 may be designed to facilitate maneuvering of the inventory holder 104 by the mobile drive unit 102. For example, as noted above, in some implementations, the docking surface 506 may comprise a high-friction portion. When the mobile drive unit 102 and the inventory holder 104 are docked, frictional forces induced between the end effector 302 and this high-friction portion may allow the mobile drive unit 102 to maneuver the inventory holder 104. Additionally, in some examples, the docking surface 506 may include appropriate components suitable to receive a portion of the end effector 302, couple the inventory holder 104 to the mobile drive unit 102, and/or facilitate control of the inventory holder 104 by the mobile drive unit 102.

A holder identifier 522 marks a predetermined portion of the inventory holder 104, and the mobile drive unit 102 may use the holder identifier 522 to align with the inventory holder 104 during docking and/or to determine the location of the inventory holder 104. In some examples, the mobile drive unit 102 may be equipped with components, such as the holder sensor 312, that can detect the holder identifier 522 and determine its location relative to the mobile drive unit 102. As a result, the mobile drive unit 102 may be able to determine the location of the inventory holder 104 as a whole. For example, the holder identifier 522 may represent a reflective marker that is positioned at a predetermined location on the inventory holder 104 and that the holder sensor 312 can optically detect using an appropriately-configured camera.

Figure 6:
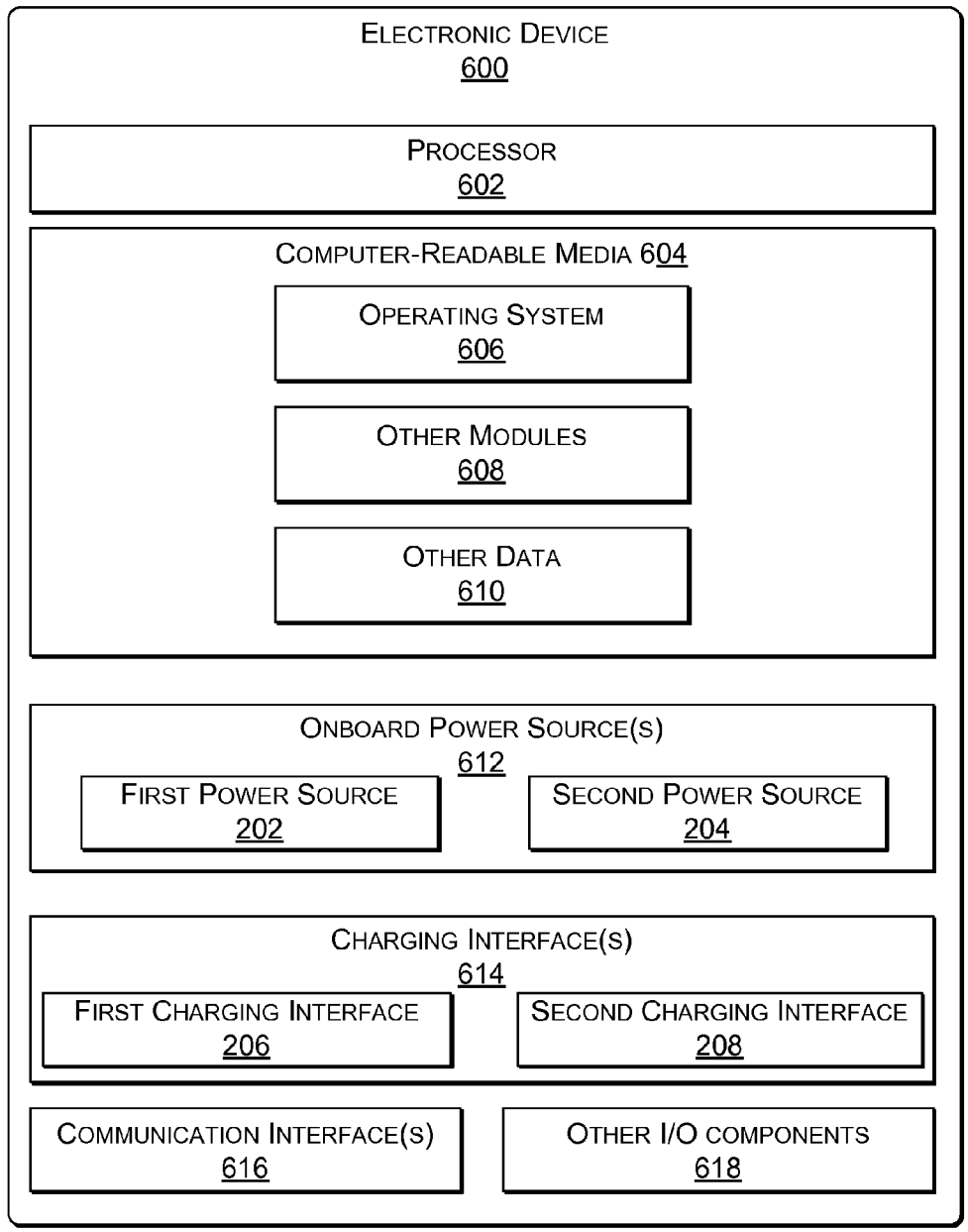
FIG. 6 illustrates select components of an example electronic device, according to some implementations.

FIG. 6 illustrates select example components of an electronic device 600 (e.g., select components of the mobile drive unit 102 of FIGS. 1-4) that may be used to implement the functionality described above according to some implementations. In a very basic configuration, the electronic device 600 includes, or accesses, components such as at least one processor 602 and a computer-readable media 604. Each processor 602 may itself comprise one or more processors or cores. The processor(s) 602 can be configured to fetch and execute computer-readable instructions stored in the computer-readable media 604 or other computer-readable media.

Depending on the configuration of the electronic device 600, the computer-readable media 604 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 602 directly or through another computing device. Accordingly, the computer-readable media 604 may be computer-readable media able to maintain instructions, modules or components executable by the processor 602.

The computer-readable media 604 may be used to store any number of functional components that are executable by the processor 602. In some implementations, these functional components comprise instructions or programs that are executable by the processor 602 and that, when executed, implement operational logic for performing the actions attributed above to the electronic device 600.

Functional components of the electronic device 600 stored in the computer-readable media 604 may include an operating system 606 for controlling and managing various functions of the electronic device 600. Depending on the type of the electronic device 600, the computer-readable media 604 may also optionally include other functional components, such as other modules 608, which may include applications, programs, drivers and so forth. The computer-readable media 604 may also store data, data structures, and the like that are used by the functional components. The electronic device 600 may also include other data 610, which may include, for example, data used by the operating system 606 and the other modules 608. Further, the electronic device 600 may include many other logical, programmatic and physical components, of which those described are merely examples that are related to the discussion herein.

FIG. 6 illustrates an implementation in which the electronic device 500 includes one or more onboard power sources 612. For example, the one or more onboard power sources 612 may include the first power source 202 and the second power source 204 illustrated in FIG. 2. Further, the electronic device 500 includes one or more charging interfaces 614. For example, the one or more charging interfaces 614 may include the first charging interface 206 and the second charging interface 208 illustrated in FIG. 2. While FIG. 2 illustrates a particular example of an electronic device that includes two charging interfaces, it will be appreciated the electronic device 500 may include a single charging interface or more than two charging interfaces. In some implementations, the first power source 202 includes a "fast charging device" such as an ultracapacitor or lithium-ion battery, while the second power source 204 includes a "slow charging device" such as a lead-acid battery.

One or more communication interfaces 616 may support both wired and wireless connection to various networks, such as cellular networks, radio, WiFi networks, short-range or near-field networks (e.g., Bluetooth®), infrared signals, local area networks, wide area networks, the Internet, and so forth.

The electronic device 600 may further be equipped with various other input/output (I/O) components 618. Such I/O components may include a touchscreen and various user actuatable controls (e.g., buttons, a joystick, a keyboard, a mouse, etc.), speakers, a microphone, a camera, connection ports, and so forth. For example, the operating system 606 of the electronic device 600 may include suitable drivers configured to accept input from a keypad, keyboard, or other user actuatable controls and devices included as the I/O components 618. For instance, the user actuatable controls may include page turning buttons, navigational keys, a power on/off button, selection keys, and so on. Additionally, the electronic device 600 may include various other components that are not shown, examples of which include various sensors (see e.g., the sensors of the example MDU 102 of FIGS. 3 and 4), removable storage, a global positioning system (GPS) device, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 7:
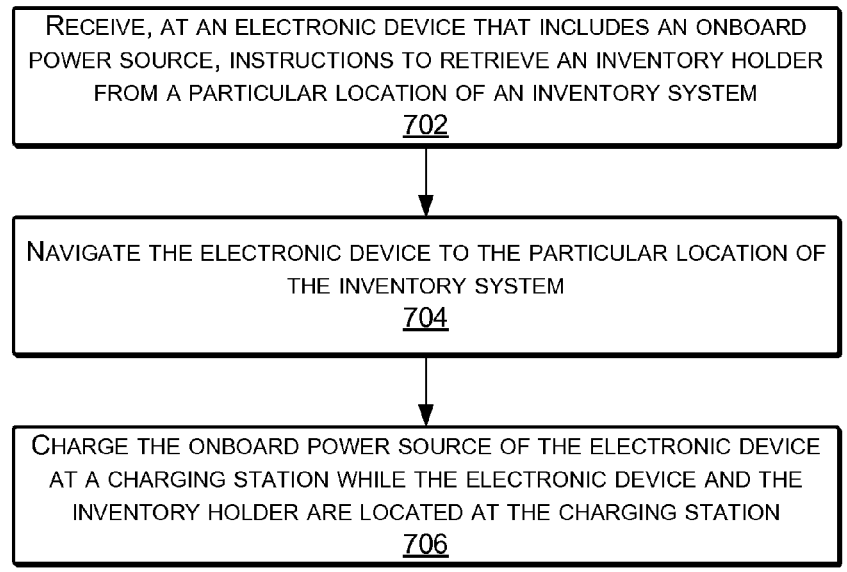
FIGS. 7 and 8 illustrate example processes for charging a mobile drive unit while the mobile drive unit is operating in an inventory system, according to some implementations.
Figure 8:
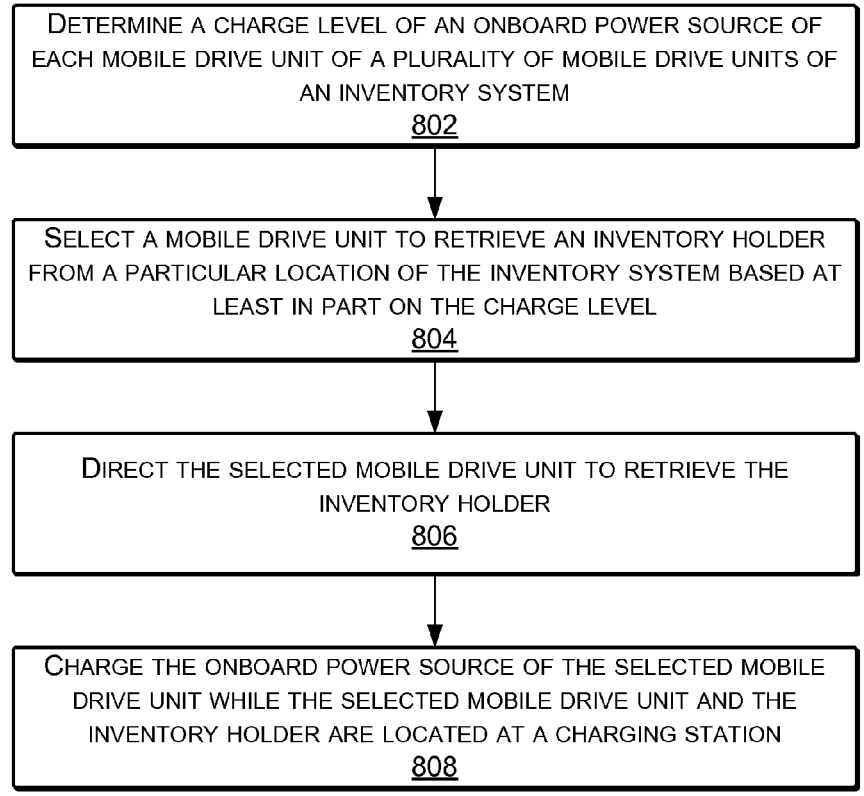

FIGS. 7 and 8 illustrate example processes 700 and 800 for charging a mobile drive unit while the mobile drive unit is operating in an inventory system, as described above. While FIGS. 7 and 8 illustrate the processes 700 and 800 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

Referring to FIG. 7, at 702, the process 700 includes receiving, at an electronic device that includes an onboard power source, instructions to retrieve an inventory holder (including one or more inventory items) from a particular location of an inventory system. As an illustrative example, referring to FIG. 1, the mobile drive unit 102 may receive instructions from the management module 110 to retrieve the inventory holder 104 of the inventory system 100. At 704, the process 700 includes navigating the electronic device to the particular location of the inventory system. For example, the mobile drive unit 102 may utilize the motorized wheels 320 (see the example MDU 102 of FIGS. 3 and 4) to navigate to retrieve the inventory holder 104 from a storage location within the workspace 106 of the inventory system 100.

At 706, the process 700 includes charging the onboard power source of the electronic device at a charging station while the electronic device and the inventory holder are located at the charging station. In some cases, the electronic device may remain docked with the inventory holder at the charging station for the duration of charging or may undock from the inventory holder for at least a portion of the charging time. To illustrate, the mobile drive unit 102 may charge an onboard power source at one of the charging stations 112(1) or 112(2) of FIG. 1. FIG. 2 illustrates an example in which the mobile drive unit 102 includes two onboard power sources, the first power source 202 (e.g., a battery) and the second power source 204 (e.g., an ultracapacitor). In some implementations, the mobile drive unit 102 may charge the second power source 204 by electromechanically coupling the mobile drive unit 102 to the MDU charging station 112 via the second charging interface 208 and the ground contact 210. Alternative methods of charging may also be used (e.g., induction coupling).

FIG. 8 illustrates another example process 800 for charging a mobile drive unit while the mobile drive unit is operating in an inventory system.

At 802, the process 800 includes determining a charge level of an onboard power source of each mobile drive unit of a plurality of mobile drive units of an inventory system. For example, while FIG. 1 illustrates a single mobile drive unit 102, it will be appreciated that the inventory system 100 may include multiple mobile drive units 102 that are remotely controllable by the management module 110, and the management module 110 may be configured to determine the charge level associated with each mobile drive unit 102. In some implementations, the management module 110 may communicate wirelessly with each mobile drive unit 102 to determine the charge level of the onboard source of each mobile drive unit 102.

At 804, the process 800 includes selecting a mobile drive unit to retrieve an inventory holder from a particular location of the inventory system based at least in part on the charge level. For example, referring to FIG. 1, the management module 110 may select the mobile drive unit 102 to retrieve the inventory holder 104 based at least in part on the charge level of an onboard power source of the mobile drive unit 102. It will be appreciated that the management module 110 may use multiple factors to select the particular MDU 102 to retrieve the inventory holder 104, including but not limited to the charge level of the onboard power source. For example, the management module 110 may determine a time period associated with performing a particular task, a location of a mobile drive unit 102 with respect to the inventory holder 104, a location of a mobile drive unit 102 with respect to an inventory station 108, a location of the inventory holder 104 with respect to an inventory station 108, or a relative speed of the operator at the inventory station 108, among other alternatives.

As an illustrative, non-limiting example, the management module 110 may determine that a particular task to be performed at the inventory station 108 may include an operator picking multiple items from the inventory holder 104. The management module 110 may determine a time period (e.g., an average "dwell time") that a mobile drive unit 102 is expected to be docked with the inventory holder 104 and located at the inventory station 108 in order for the operator to perform the picking task. Accordingly, in this example, the management module 110 may select the mobile drive unit 102 in order to recharge the onboard power source at the charging station 112(1) located at the inventory station 108 based at least in part on the expected dwell time associated with the task. It will be appreciated that the management module 110 may select the mobile drive unit 102 with a higher charge level to perform a task involving a shorter dwell time, while the management module 110 may select a different mobile drive unit 102 with a lower charge level to perform a task involving a longer dwell time.

At 806, the process 800 includes directing the selected mobile drive unit to retrieve the inventory holder. At 808, the process 800 includes charging the onboard power source of the selected mobile drive unit while the selected mobile drive unit and the inventory holder are located at a charging station.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A mobile drive unit comprising:
   one or more onboard power sources;
   a communication module to receive instructions, from a management module of an inventory system, to retrieve an inventory holder from a particular location in the inventory system;
   a drive module to propel the mobile drive unit to at least the particular location of the inventory system using power from the one or more onboard power sources; and
   a charging interface to couple at least one of the one or more onboard power sources to a charging station associated with an inventory station to charge the at least one onboard power source while (i) the mobile drive unit and the inventory holder are located at the inventory station and (ii) the mobile drive unit is expected to remain stationary for an amount of time associated with completion of a user task associated with the inventory holder;
   wherein the user task associated with the inventory holder comprises at least one of removal or restocking of one or more inventory items from the inventory holder.

2. The mobile drive unit as recited in claim 1, wherein the at least one onboard power source is electromechanically coupled to the charging station via a ground contact.

3. The mobile drive unit as recited in claim 1, further comprising:
one or more induction components,
wherein the at least one onboard power source is coupled to the charging station via an induction coupling component that is associated with the charging station.

4. A method comprising:
under control of one or more processors of an electronic device that includes an onboard power source, the electronic device specifically configured with executable instructions to:
receive instructions to retrieve an inventory holder from a particular location of an inventory system based at least in part on a dwell time associated with a task to be performed with respect to the inventory holder;
navigate the electronic device to the particular location responsive to receiving the instructions; and
charge the onboard power source at a charging station while the electronic device and the inventory holder are located at the charging station and the task is performed.

5. The method as recited in claim 4, further comprising navigating the electronic device including the retrieved inventory holder from the particular location to a different location of the inventory system for charging the onboard power source at the charging station.

6. The method as recited in claim 4, further comprising electromagnetically coupling the onboard power source to the charging station.

7. The method as recited in claim 4, further comprising coupling the onboard power source to the charging station via a wireless coupling component.

8. The method as recited in claim 7, further comprising coupling the onboard power source to the charging station via an induction coupling component.

9. The method as recited in claim 4, further comprising charging the onboard power source while the electronic device is docked with the inventory holder at the charging station.

10. The method as recited in claim 4, further comprising charging an onboard power source at the charging station;
wherein the onboard power source includes a first onboard power source that is electrically coupled to a second onboard power source of the electronic device.

11. The method as recited in claim 10, further comprising charging the second onboard power source from the first onboard power source.

12. The method as recited in claim 10, further comprising:
charging the first onboard power source at a first charge rate; and
charging the second onboard power source at a second charge rate;
wherein the first charge rate is greater than the second charge rate.

13. The method as recited in claim 12, wherein:
charging the first onboard power source includes charging a capacitor; and
charging the second onboard power source includes charging a battery.

14. The method as recited in claim 12, wherein:
charging the first onboard power source includes charging a first type of battery; and
charging the second onboard power source includes charging a second type of battery that is different from the first type of battery.

15. The method as recited in claim 14, wherein:
charging the first type of battery includes charging a lithium-ion battery; and
charging the second type of battery includes charging a lead-acid battery.

16. An inventory system comprising:
a plurality of mobile drive units remotely controllable to transport a plurality of inventory holders about a warehouse;
a charging station to charge an onboard power source of the plurality of mobile drive units; and
a management module configured to:
determine a charge level of the onboard power source of each mobile drive unit of the plurality of mobile drive units;
determine a dwell time associated with a task to be performed with respect to an inventory holder of the plurality of inventory holders while at the charging station;
select a mobile drive unit of the plurality of mobile drive units to retrieve the inventory holder based at least in part on the charge level of the onboard power source of the mobile drive unit and the dwell time associated with the task;
direct the mobile drive unit to move the inventory holder from a particular location in the inventory system to the charging station;
wherein the charging station charges the onboard power source of the mobile drive unit while the mobile drive unit and the inventory holder are located at the charging station and the task is being performed.

17. The inventory system of claim 16, wherein a first mobile drive unit of the plurality of mobile drive units has a higher state of charge than a second mobile drive unit of the plurality of mobile drive units;
wherein a first task has a longer dwell time than a second task; and
wherein the management module selects the second mobile drive unit to perform the first task based on a lower state of charge of the second mobile drive unit and the longer dwell time of the first task.

18. The inventory system of claim 17, wherein the management module selects the first mobile drive unit to perform the second task based on the higher state of charge of the first mobile drive unit and a shorter dwell time of the second task.

19. The inventory system of claim 16, wherein each of the plurality of mobile drive units further comprise at least one onboard power source; and
wherein the at least one onboard power source is electromechanically coupled to the charging station via a ground contact.

20. The inventory system of claim 16, wherein each of the plurality of mobile drive units further comprises:
at least one onboard power source; and
one or more induction components,
wherein the at least one onboard power source is coupled to the charging station via an induction coupling component that is associated with the charging station.

* * * * *